US 8,518,317 B2

(12) United States Patent
Mancini

(10) Patent No.: US 8,518,317 B2
(45) Date of Patent: Aug. 27, 2013

(54) PROCESS FOR PRODUCING PNEUMATIC TYRES

(75) Inventor: Gianni Mancini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 853 days.

(21) Appl. No.: 12/309,186

(22) PCT Filed: Jul. 11, 2006

(86) PCT No.: PCT/IT2006/000530
§ 371 (c)(1),
(2), (4) Date: Jan. 9, 2009

(87) PCT Pub. No.: WO2008/007400
PCT Pub. Date: Jan. 17, 2008

(65) Prior Publication Data
US 2009/0174122 A1    Jul. 9, 2009

(51) Int. Cl.
*B29C 35/02*    (2006.01)
*B29D 30/08*    (2006.01)

(52) U.S. Cl.
USPC .............. 264/315; 156/135; 264/326; 425/36; 425/38

(58) Field of Classification Search
USPC ................. 264/315, 326, 501; 156/132, 135; 425/36, 38
See application file for complete search history.

(56) References Cited

U.S. PATENT DOCUMENTS

| | | | |
|---|---|---|---|
| 1,526,594 A * | 2/1925 | Gammeter et al. ........... | 156/135 |
| 1,528,659 A | 3/1925 | Mattia | |
| 2,625,981 A | 1/1953 | Wallace | |
| 2,645,265 A * | 7/1953 | O'Neil ........................... | 156/135 |
| 3,620,561 A * | 11/1971 | Grotkasten et al. ........... | 294/106 |
| 5,034,079 A * | 7/1991 | Rach et al. .................... | 156/135 |
| 6,328,084 B1 | 12/2001 | Caretta et al. | |

FOREIGN PATENT DOCUMENTS

| EP | 0 604 984 A1 | 7/1994 |
|---|---|---|
| GB | 1 542 132 | 3/1979 |
| GB | 1 542 133 | 3/1979 |
| GB | 2 185 211 A | 7/1987 |
| JP | 54-10383 | 1/1979 |
| WO | WO 2005/042237 A1 | 5/2005 |
| WO | WO 2006/033120 A1 | 3/2006 |

OTHER PUBLICATIONS

Notification of the First Office Action with English language translation issued by Patent Office of the People's Republic of China on Jul. 4, 2011, in corresponding Chinese Application No. 200680055282.9.

* cited by examiner

*Primary Examiner* — James Mackey
(74) *Attorney, Agent, or Firm* — Finnegan, Henderson, Farabow, Garrett & Dunner, L.L.P.

(57) ABSTRACT

A green tire is built on a forming drum and then transferred to a bead molding and pre-vulcanization station where each bead of the tire is molded by tightening it between two axially opposite clamping surfaces respectively carried by an axially external annular locating element and an axially internal annular locating element consisting of radially expandable circumferential sectors. The tightened beads can be pre-vulcanized through heat supply by means of electric resistors integrated into the axially external annular locating elements. The tire with the tightened and possibly pre-vulcanized beads is transferred to a molding cavity having an inner wall substantially conforming to the shape of an outer surface of the molded tire to carry out molding and complete vulcanization of the tire.

46 Claims, 7 Drawing Sheets

PROCESS FOR PRODUCING PNEUMATIC TYRES

CROSS REFERENCE TO RELATED APPLICATION

This application is a national phase application based on PCT/IT2006/000530, filed Jul. 11, 2006, the content of which is incorporated herein by reference.

BACKGROUND OF THE INVENTION

1. Field of the Invention

The present invention relates to a process and an apparatus for producing pneumatic tyres.

2. Description of the Related Art

A tyre for vehicle wheels generally comprises a carcass structure including at least one carcass ply having respectively opposite end flaps in engagement with respective annular anchoring structures integrated into the regions usually identified as "beads".

Associated with the carcass structure is a belt structure comprising one or more belt layers located in radially superposed relationship with respect to each other and to the carcass ply and having textile or metallic reinforcing cords with a crossed orientation and/or substantially parallel to the circumferential extension direction of the tyre. A tread band is applied to the belt structure at a radially external position, which tread band too is made of elastomeric material like the other semifinished products constituting the tyre.

It is to be pointed out herein that, to the aims of the present description, by the term "elastomeric material" it is intended a compound comprising at least one elastomeric polymer and at least one reinforcing filler. Preferably, this compound further comprises additives such as cross-linking agents and/or plasticizers, for example. Due to the presence of the cross-linking agents, this material can be cross-linked by heating, so as to form the final manufactured product.

Respective sidewalls of elastomeric material are also applied to the side surfaces of the carcass structure, each extending from one of the side edges of the tread band until close to the respective annular anchoring structure to the beads. In tyres of the tubeless type, an air-tight coating layer usually referred to as "liner", covers the inner tyre surfaces.

Producing processes are known in which, subsequently to building of the green tyre through assembling of respective components on a building machine, a moulding and vulcanising treatment is carried out for the purpose of determining the structural stabilisation of the tyre through cross-linking of the elastomeric compounds and forming a desired tread pattern thereon, as well as printing possible distinctive graphic signs at the tyre sidewalls.

To this aim, the green tyre is introduced into a suitably heated vulcanisation mould, having a moulding cavity conforming in shape to the final conformation to be given to the tyre itself.

After carrying out closure of the mould, a bladder of toroidal conformation having its opposite ends in engagement with respective anchoring flanges is allowed to expand within the tyre. Bladder expansion is obtained through admission of steam under pressure into the bladder itself, so as to bring the latter into contact with the inner surface of the tyre and press the tyre against the walls of the moulding cavities while at the same time transmission of the required heat for cross-linking takes place.

Generally, in vulcanisation processes, steam under pressure admitted into the expandable bladder causes supply of part of the necessary heat for carrying out vulcanisation. Another part of the necessary heat is usually supplied through the mould from the outside of the tyre, suitably heated by means of channels provided in the vulcanisation apparatus through which steam or other heating fluid runs.

A moulding and vulcanising treatment of the above mentioned type is described in JP 54-010383, for example. According to this document's disclosure, a bead ring lends itself to be removably coupled with one of the anchoring flanges of the bladder when the green tyre has been positioned around the bladder itself. The bladder ends are simultaneously moved close to each other on admission of steam into the bladder, so that the green tyre is preformed into a toroidal conformation before closure of the mould is carried out for accomplishment of the tyre moulding and vulcanising treatment.

In putting said processes into practice, the Applicant could notice some difficulties correlated with the tyre moulding and vulcanising treatment. Actually, the Applicant wishes to carry out a forced tyre expansion during the moulding and vulcanising step to achieve the desired operating features, by virtue of an induced pre-tensioning action on the belt structure and the cords constituting the carcass ply or plies. However, it has been observed that a pre-tensioning operation overcoming some limits may cause an undesirable modification in the structural geometry of the finished product. As a matter of fact, an insufficient anchoring of the carcass cords at the beads can give rise to partial slipping off of the cords themselves.

The Applicant has then observed that when the tyres are introduced into the moulding and vulcanisation press, perfect centring of the tyre can be hardly achieved, and this difficulty will bring about non negligible consequences on the finished product. In fact, an optimal centring of the tyre relative to the moulding cavity is presently a determinant quality for a correct geometric and structural definition of the beads, on which the structural integrity of the whole tyre depends, as well as the tyre vibratory uniformity.

SUMMARY OF THE INVENTION

The Applicant has therefore perceived that by locking the tyre beads by means of a suitable device at the end of the building step, the above mentioned problems could be solved.

In accordance with the present invention, the Applicant has found that by submitting the beads to a tightening step and subsequently to a preliminary moulding step before carrying out the tyre moulding and vulcanisation steps, important advantages can be achieved both in terms of machinery and productivity simplification and in terms of quality of the finished product.

In particular, in accordance with a first aspect of the invention, it is proposed a process for producing pneumatic tyres, comprising the steps of:

i) building a green tyre, which green tyre has a pair of beads each defined along a respective inner circumferential edge of said tyre;

ii) tightening each bead between two axially opposite clamping surfaces;

iii) transferring the tyre into a moulding cavity of a vulcanisation press having an inner wall substantially conforming to the shape of an outer surface of the moulded tyre;

iv) moulding and vulcanising the tyre;

wherein at least during the steps iii) and iv), tightening of the beads between said clamping surfaces is maintained.

Tightening of the beads between the opposite clamping surfaces, carried out before transferring the tyre into the mould and maintained during the tyre moulding and vulcanisation step, advantageously gives rise to a moulding action involving geometric and structural stabilisation of the beads by exerting a retaining action on the cords of the carcass structure and other reinforcing components integrated into the beads.

Consequently, the cords can be submitted to pre-tensioning actions during the subsequent tyre moulding and vulcanisation steps without any risk of the cords slipping off the beads or of other structural faults in the tyre.

By keeping the beads tightened between the clamping surfaces during the subsequent tyre transferring and moulding steps too, centring of the tyre within the mould is also simplified and improved, the risk of deforming or damaging the beads on enclosing the tyre into the mould being eliminated as well, thus avoiding any phenomenon of remoulding of the beads themselves.

According to a preferred solution, the process in accordance with the invention comprises a step of at least partial pre-vulcanisation of the beads tightened between the clamping surfaces.

It has been noticed in this regard that, in the processes described with reference to the known art, a correct distribution of heat supplied to the different tyre parts can be difficult, also because some of these parts having extended surfaces in contact with the inner walls of the mould, the tread band and sidewalls for example, can receive more heat than others, such as the beads that are of greater thickness and/or have seduced surfaces exposed to direct contact with the mould. Consequently, to achieve a correct cross-linking of the bead regions of the tyre, a greater heat supply can be required than that necessary for cross-linking of other parts of the tyre.

Due to the preliminary pre-vulcanisation step of the beads carried out in accordance with the present invention, the final vulcanisation degree of the beads can be advantageously controlled without significantly affecting the cross-linking degree of the remaining parts of the tyre.

In addition, the moulding and/or vulcanisation steps can be carried out by enclosing the tyre into the mould for the time strictly required to obtain sufficient structural strengthening of the remaining parts of the tyre itself, without the necessity of long periods of time for achieving a sufficient strengthening at the beads.

Furthermore, pre-vulcanisation of the beads advantageously causes a further strengthening of the bead structure and of the links with the cords of the carcass structure and other reinforcing components integrated into the beads. As a result, the cords can be submitted to important pre-tensioning actions during the following tyre moulding and vulcanising steps without running the risk of the cords slipping off the beads or of other structural faults in the tyre.

Carrying out pre-vulcanisation of the beads concurrently with a bead moulding step further enables the geometric and structural accuracy of the beads to be further improved.

According to a further aspect, the invention relates to an apparatus for producing pneumatic tyres, comprising:
 a building unit designed to form a green tyre having a pair of beads each defined along a respective inner circumferential edge of said tyre;
 bead moulding devices, to tighten each bead between two axially opposite clamping surfaces;
 a moulding unit of the tyre having a moulding cavity with an inner wall substantially conforming in shape to an outer surface of the moulded tyre;
 devices for vulcanising the tyre;
 actuating devices for transferring the tyre together with said bead moulding devices into the moulding cavity.

Further features and advantages will become more apparent from the detailed description of a preferred but not exclusive embodiment of a process and an apparatus for producing pneumatic tyres in accordance with the present invention.

BRIEF DESCRIPTION OF THE DRAWINGS

This description will be set out hereinafter with reference to the accompanying drawings given by way of non-limiting example, in which.

DETAILED DESCRIPTION OF THE INVENTION

Figure 1:
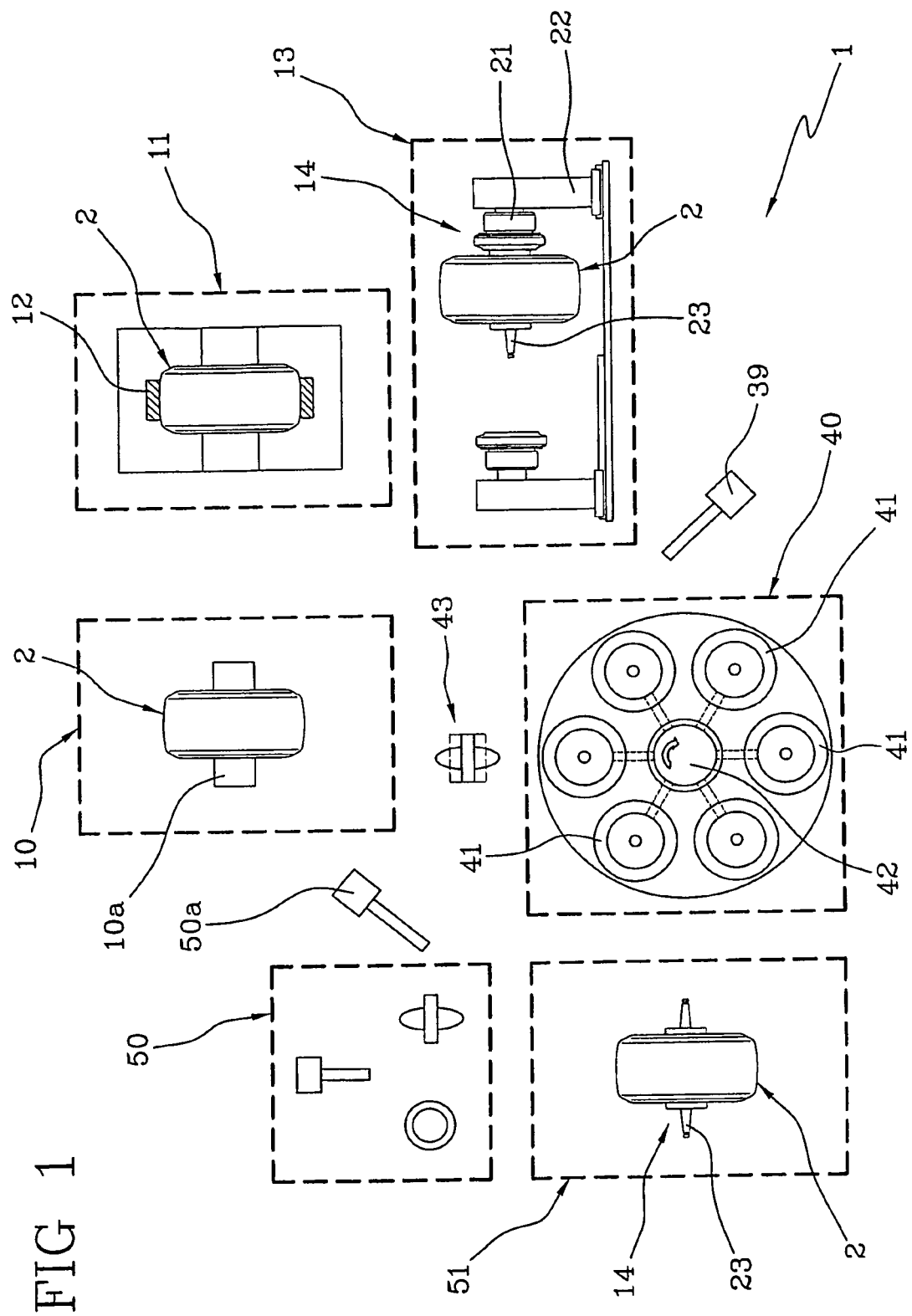
FIG. 1 is a diagrammatic top view of an apparatus for building tyres in accordance with the present invention.
Figure 2:
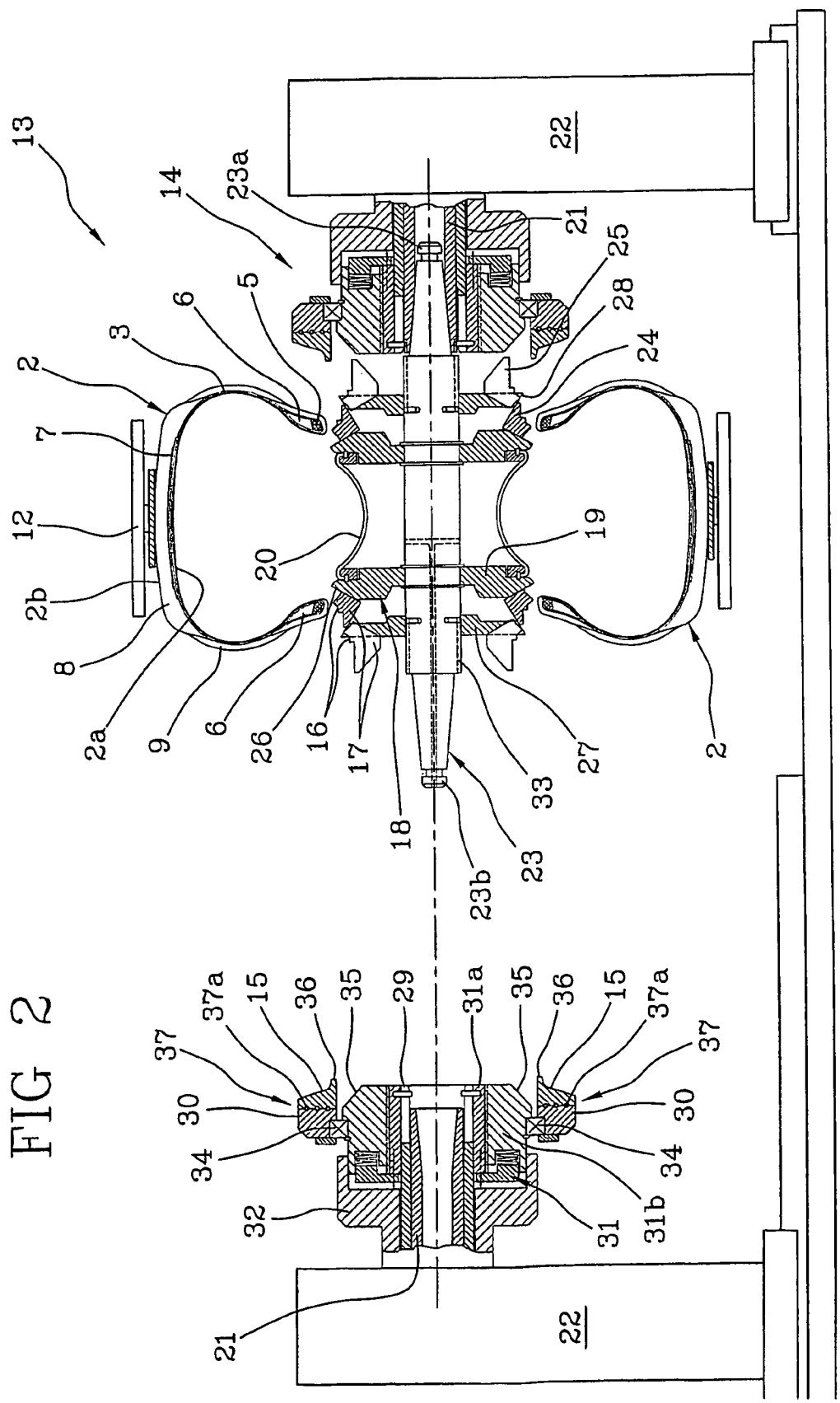
FIG. 2 diagrammatically shows a tyre in diametrical section during an engagement step in a bead moulding and pre-vulcanisation station.

Referring particularly to FIG. 1, an apparatus for producing pneumatic tyres for vehicle wheels provided for carrying out a process in accordance with the present invention has been generally identified with reference numeral 1.

Figure 3:
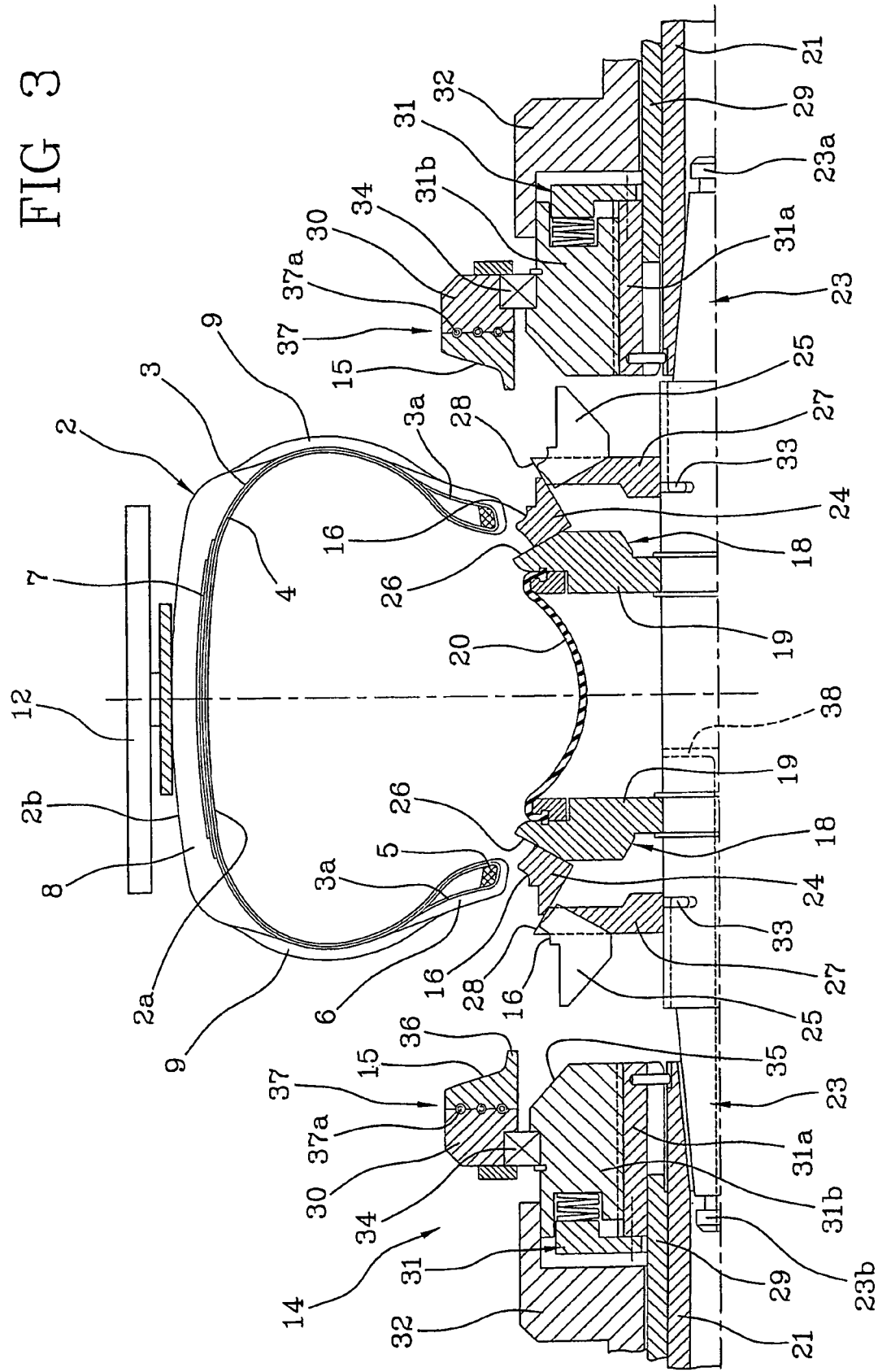
FIG. 3 shows an initial step of the tyre bead engagement by means of bead moulding devices.
Figure 4:
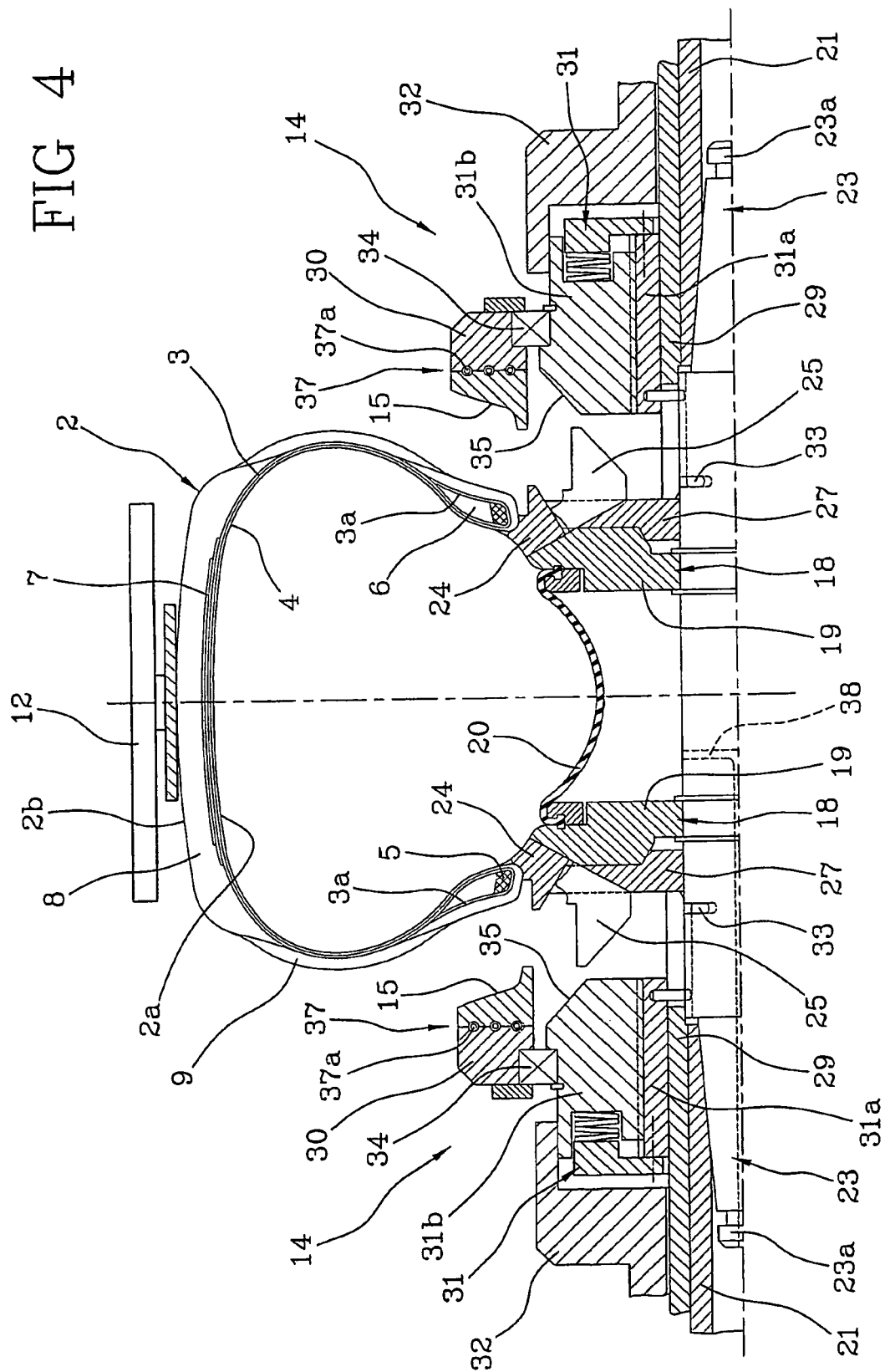
FIG. 4 shows a bead engagement step subsequent to the step in FIG. 3.
Figure 5:
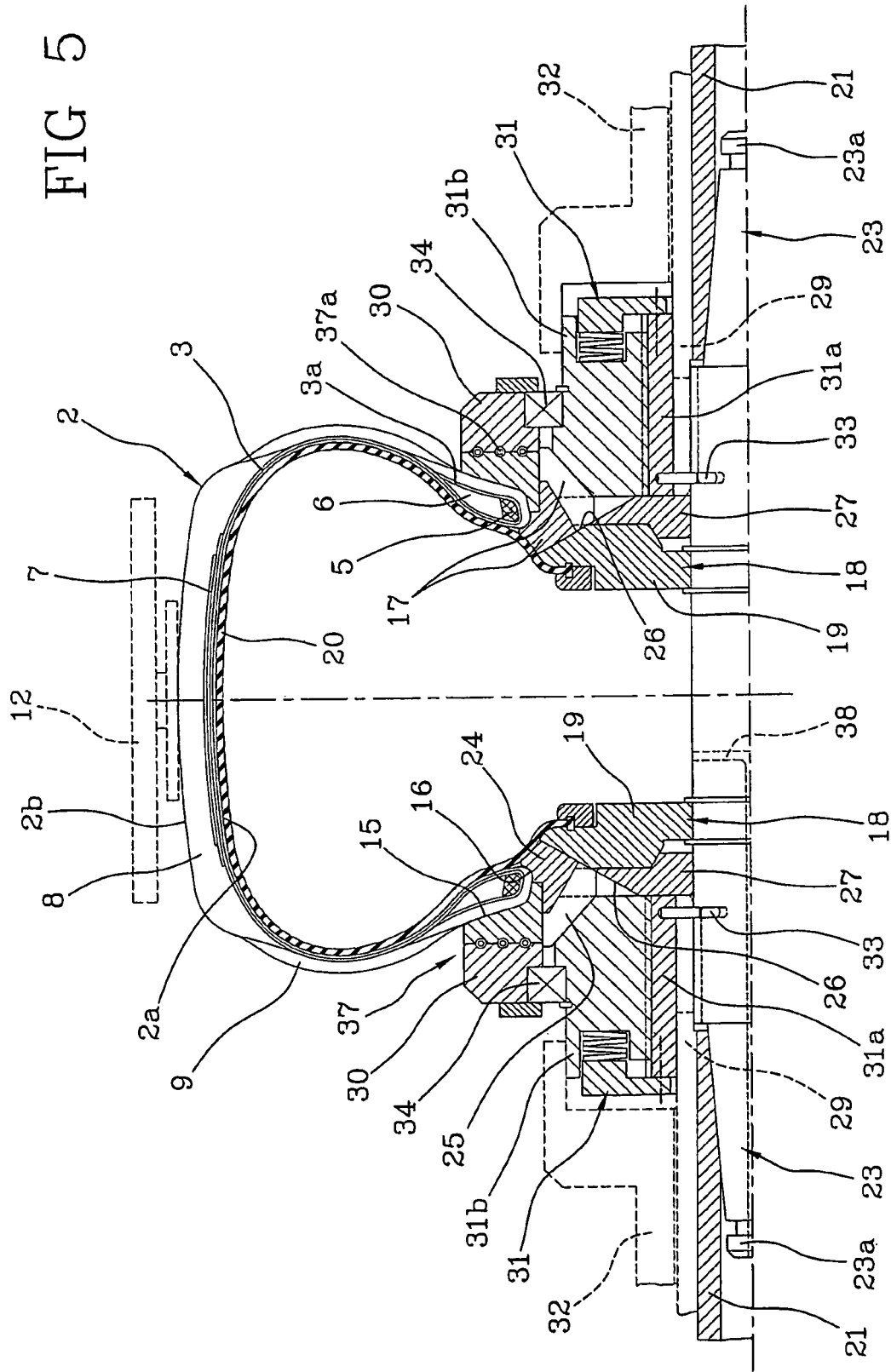
FIG. 5 shows the tyre during a bead moulding and pre-vulcanisation step.
Figure 6:
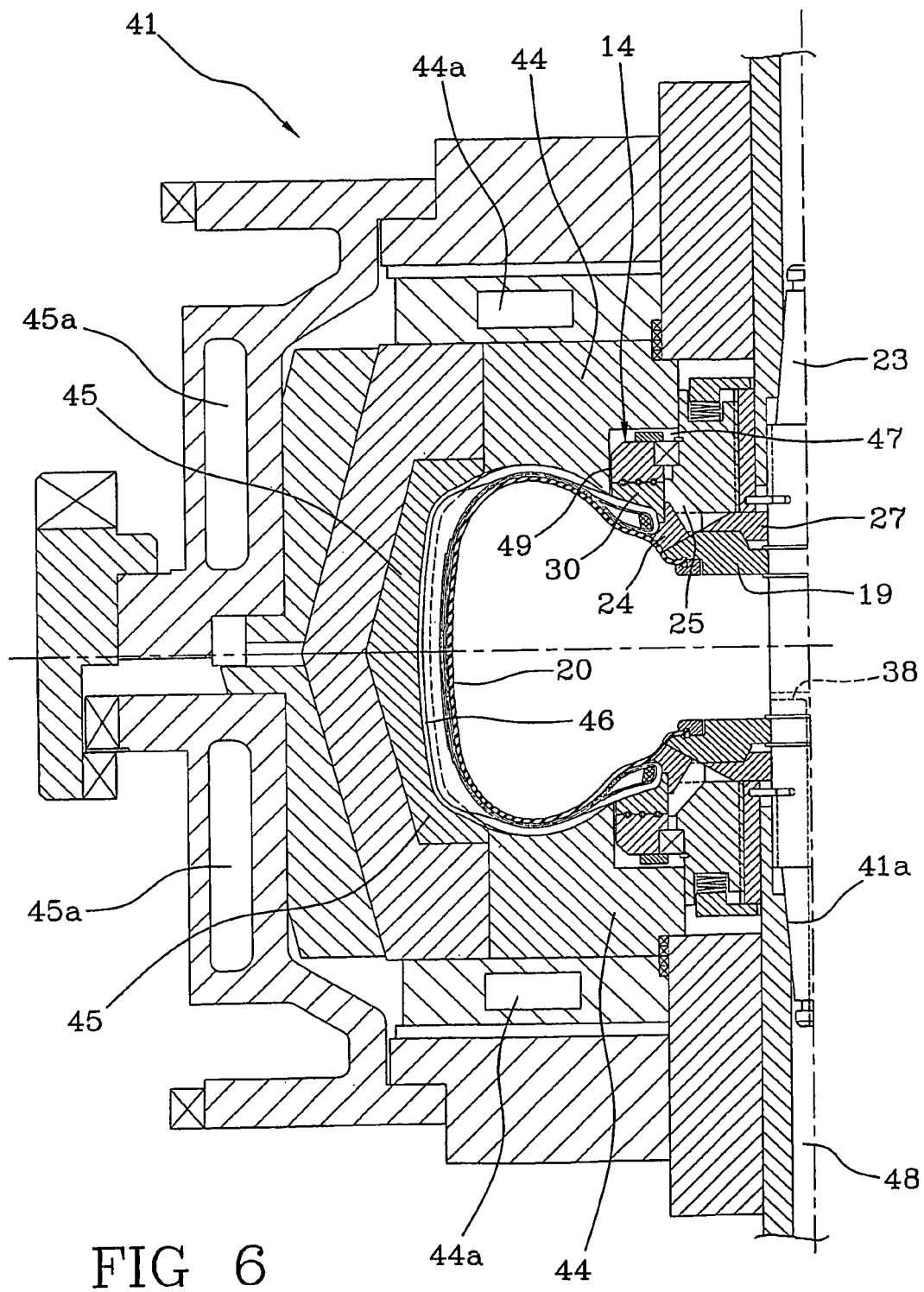
FIG. 6 diagrammatically shows a diametrical-section view of the tyre introduced into a vulcanisation mould.
Figure 7:
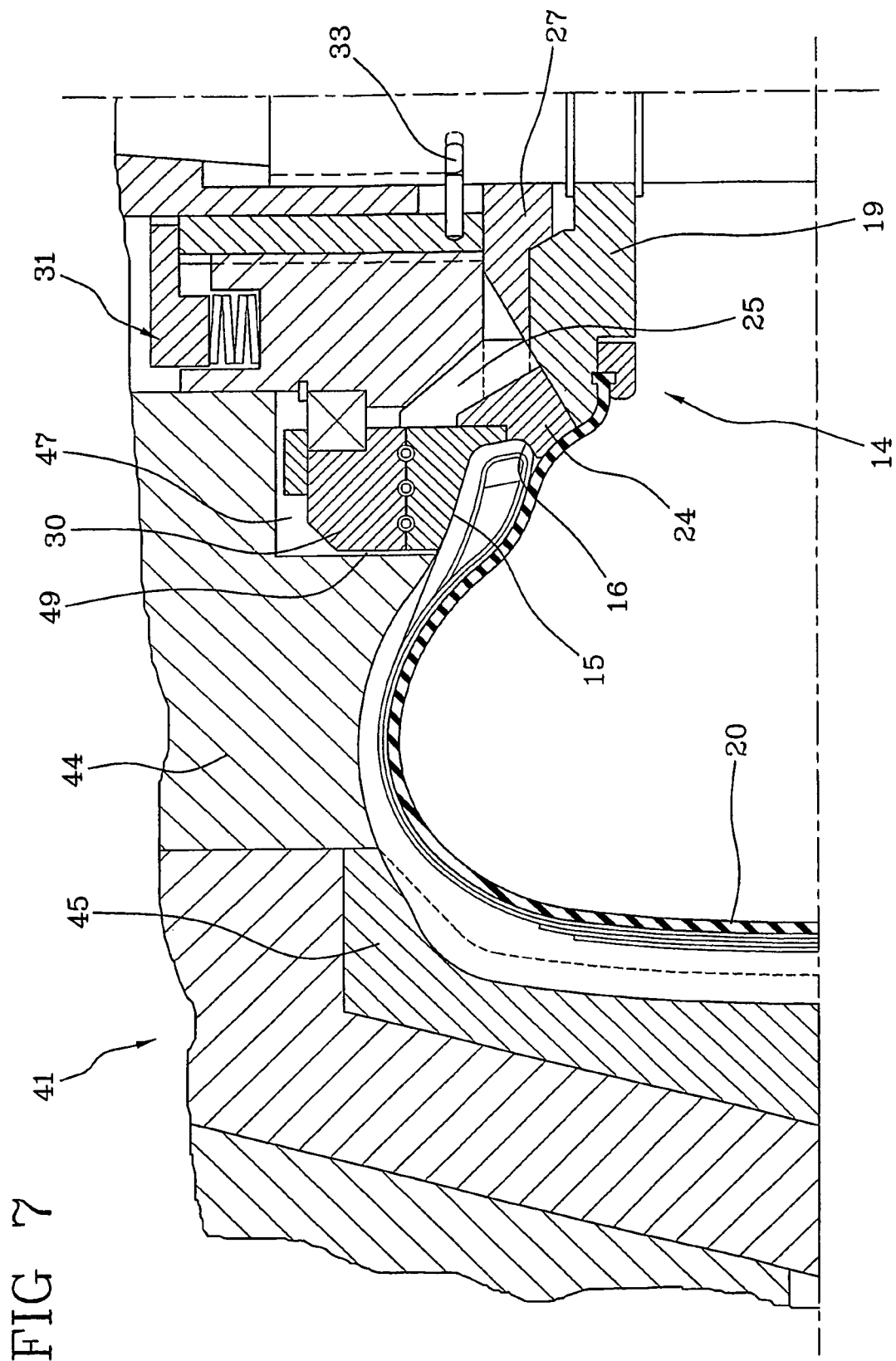
FIG. 7 shows the tyre seen in FIG. 4 during a vulcanisation step.

Apparatus 1 is intended for manufacturing tyres 2 (FIG. 3) essentially comprising at least one carcass ply 3 internally coated with an airtight layer of elastomeric material or so-called liner 4, two annular reinforcing structures 5 in engagement with end flaps 3a of the carcass ply or plies 3 close to respective regions usually referred to as beads 6. A belt structure 7 is circumferentially applied around the carcass ply 3 and a tread band 8 circumferentially overlaps the belt structure 7. Two sidewalls 9 each extending from the corresponding bead 6 to the corresponding side edge of the tread band 8 are applied to the carcass ply 3 at laterally opposite positions.

Apparatus 1 essentially comprises at least one building unit 10 integrating devices adapted to form the tyre 2 by assembling the different construction components of the tyre 2 itself on a forming drum 10a, i.e. carcass plies 3, liner 4, annular reinforcing structures 5, belt structure 7, tread band 8, sidewalls 9 and/or others, each of them made in the form of a semifinished product. Building of the green tyre 2 can involve use of devices designed to turn up the end flaps 3a around the respective annular reinforcing structures 5.

Alternatively, one or more of said construction components can be directly formed on the tyre 2 being processed (with the aid of a building drum mating the shape of the tyre itself), through application of basic components consisting for example of rubber-coated individual cords or rubber-coated cords partly gathered in parallel in the form of a strip-like element, elongated rubber elements, etc., as described in document U.S. Pat. No. 6,328,084 in the name of the same Applicant, for example.

When building has been completed, the tyre 2 comes close to a transfer station 11 interlocked with a transfer device 12, of the endless type for example. The transfer device 12 lends itself to disengage the green tyre 2 from the forming drum 10a and transfer it to a bead moulding and prevulcanisation station, generally denoted at 13, in which the beads 6 are moulded and, if needed, at least partly prevulcanised separately from the remaining parts of tyre 2 that are substantially maintained to a green state.

For the purpose, the bead moulding and pre-vulcanisation station 13 comprises bead moulding devices 14 designed to tighten each bead 6 between two axially opposite clamping surfaces, i.e. an axially external 15 and an axially internal 16 clamping surfaces, respectively.

In more detail, provision is made for axially internal clamping surfaces 16 each formed on an axially internal annular locating element 17 carried by an expandable toroidal support 18 comprising a pair of axially opposite flanges 19 to be positioned to a desired mutual distance, and expandable bladder 20 having opposite edges each peripherally in engagement with one of the flanges 19. The flanges 19 have an outer diametrical size smaller than the inner diameter of the green tyre 2, so as to enable axial insertion of the expandable toroidal support 18 into the tyre itself in an axially centred position, while the latter is retained by the transfer device 12 in the bead moulding and pre-vulcanisation station 13.

The expandable toroidal support 18 is removably connected in overhanging, according to a substantially horizontal axis, to a support member 21, a chuck for example, borne by a base 22 and adapted to be operatively coupled to a first end of a grip pivot 23 coaxially carrying the flanges 19 of the toroidal support itself. The grip spigot 23 can be formed with two portions in telescopic mutual engagement and axially lockable with respect to each other, to enable adjustment of the axial distance between the flanges 19 each carried by one of said portions.

Each of the axially internal annular locating elements 17 comprises sectors 24, 25 that are circumferentially contiguous and radially movable between a radially expanded condition, at which the axially internal annular locating element 17 has a greater outer diameter than the inner diameter of the respective bead 6, and a radially contracted position at which the axially internal annular locating element 17 has a maximum diametrical size smaller than the inner diameter of the bead itself, to enable it to be axially introduced into and removed from tyre 2.

In more detail, each axially internal annular locating element 17 comprises first circumferential sectors 24 and second circumferential sectors 25 arranged circumferentially alternated with each other. The first circumferential sectors 24 of each axially internal annular locating element 17 are oscillatably carried by the respective flange 19 of the expandable toroidal support 18, at one or more sliding surfaces 26 having a development converging towards the geometric axis of the expandable toroidal support 18. The second circumferential sectors 25 of each of the axially internal annular locating elements 17 are in turn oscillatably carried by a counter-flange 27 adapted to be coaxially engaged along the grip spigot 23 and moved close to the corresponding flange 19, upon the action of a first handling device 29 coaxially movable relative to the expandable toroidal support 18 borne by the support member 21.

Following movement of the second circumferential sectors 25 along the sliding surfaces 26 of the respective flanges 19, said second circumferential sectors can be each inserted, in circumferential-continuity relationship, between two of the first circumferential sectors 24, already set in the radially expanded condition, so that together with the latter they form the first axially internal clamping surfaces 16 substantially without discontinuity.

Translation of the first circumferential sectors 24 towards the radially expanded condition can be advantageously carried out by means of first thrust surfaces 28 carried by each of the counter-flanges 27, during axial moving of the counter-flanges themselves close to the flanges 19. To this aim, after the green tyre 2 has been positioned around the expandable toroidal support 18 borne by the support member 21 with the circumferential sectors 24, 25 in the contracted condition, the first handling devices 29 move the counter-flanges 27 close to the respective flanges 19, to cause translation of the first circumferential sectors 24 to the radially expanded condition.

Subsequently, by an external actuating device not shown, or as better described in the following, the second circumferential sectors 25 too are brought to the radially expanded condition, being circumferentially interposed between the first circumferential sectors 24 to form the axially internal clamping surfaces 16.

Electromagnets or other suitable devices (not shown) can be associated with the flanges 19 to retain the first and second circumferential sectors 24, 25 to the radially expanded and radially contracted conditions, and/or to retain the counter-flanges 27 in approached relationship with the flanges 19.

The bead moulding devices 14 further comprises axially external clamping surfaces 15, each defined on an axially external annular locating element 30 that can be moved close to the axially internal annular locating element 17. In more detail, each axially external annular locating element 30 can be operatively carried by a hub 31 adapted to be removably engaged by a second handling device 32 that is coaxially movable relative to the expandable toroidal support 18 borne by the support member 21. The second handling devices 32 move the axially external annular locating elements 30 close to the expandable toroidal support 18, on axially opposite sides, until they urge them against the respective beads 6 of tyre 2 to cause tightening and subsequent moulding of the beads themselves, and adapting the geometric conformation of the latter to that of the mutually coupled clamping surfaces 15, 16.

By bayonet joints 33 or other suitable engagement devices operating between the grip spigot 23 of the expandable toroidal support 18 and each hub 31, the axially external annular locating elements 30 are steadily engaged with respect to the expandable toroidal support 18. When engagement has been carried out, the second handling devices 32 can be released from the hubs 31 and moved away from the respective axially external annular locating elements 30. The first handling devices 29 can be released and moved apart from the respective counter-flanges 27 before or after intervention of the second handling devices 32.

If required, rolling bearings 34 can be operatively interposed between each axially external annular locating element 30 and the respective hub 31 to enable angular rotation of the latter for operation of the bayonet joints 33 without causing the annular locating element itself to be driven in rotation, so as to prevent the axially external clamping surfaces 15 from undesirably sliding on the raw elastomeric material forming the beads 6. In addition or alternatively, the second handling devices 32 can be utilised to exert an axial thrust action of the axially external annular locating elements 30 towards the expandable toroidal support 18 and keep it for a desired period of time, so as to promote moulding of the beads 6 by the clamping surfaces 15, 16 acting against each other.

The axial approaching and rotation movement of the axially external annular locating elements 30 can be also utilised to obtain translation of the second circumferential sectors 25 from the radially contracted condition to the radially expanded condition, with the aid of possible second thrust surfaces 35 integral with the annular locating elements themselves and in the shape of helical-profile cams. More specifically, sectors 25 radially slide on flanges 27 along guides provided with return springs for release of the tightened bead portion, during the step of unloading the finished tyre.

Each axially external annular locating element 30 is provided, at an axially internal position, with an abutment shoulder 36 or other stop element designed to act against the respective axially internal annular locating element 17 to stop approaching of the axially external clamping surface 15 to a predetermined distance relative to the corresponding radially internal clamping surface 16. Thus, moulding of the beads 6 of the so-called "imposed-volume" type can be carried out.

In addition to or as an alternative to the abutment shoulders 36, by means of spring elements the clamping surfaces 15, 16 can be urged against each other with a predetermined tightening load during moulding of the beads 6, to enable moulding of the latter according to a predetermined clamping pressure. In the example shown, the spring elements for each axially external annular locating element 30, comprise Belleville washers 52 operatively interposed between a fixed portion 31a of the hub 31, integral with the bayonet joint 33, and a movable portion 31b of the hub 31 itself, integral with the respective axially external annular locating element 30 and axially slidable relative to the fixed portion 31a. The Belleville washers 52 are adapted to yield on achievement of a given pre-load, to enable closure of the bayonet joint 33 without an excessive pressing action being imposed to the beads 6 even if, for instance, the latter due to material excess, should have a greater volume than that delimited between the mutually approached clamping surfaces 15, 16, the abutment shoulders 36 being against the axially internal annular locating elements 17.

Also operating in the moulding and pre-vulcanisation station 13 are pre-vulcanisation devices essentially comprising localised tyre heating members 37 close to the beads 6. More particularly, these localised heating members 37 can be at least partly integrated into the bead moulding devices 14, by means of electric resistors 37a incorporated into the axially external annular locating elements 30, for example. In addition or alternatively, electric resistors 37a can be integrated into the axially internal annular locating elements 17 and/or into the flanges 19 of the expandable toroidal support 18.

After the beads 6 have been tightened between the clamping surfaces 15, 16, the electric resistors 37a can be activated, by means of electric connectors (not shown) carried by the second handling devices 32 for example, over a predetermined period of time adapted to obtain a desired cross-linking degree in the elastomeric material of which the beads 6 of tyre 2 are made.

Once tightening of the beads 6 between the clamping surfaces 15, 16 has been carried out, fluid under pressure can be admitted into the expandable bladder 20 through an inlet 38 provided in the expandable toroidal support 18, to cause radial expansion of the bladder itself within tyre 2. When inflation has been completed, the endless transfer device 12 can be disengaged and moved away from the tyre 2 that advantageously will be still supported and stabilised in its geometric conformation by effect of the inner inflated bladder 20.

A robotized transfer arm 39 or other suitable actuating devices pick up the expandable toroidal support 18 and the green tyre engaged thereon from the moulding and pre-vulcanisation station 13 to transfer them to a moulding unit 40. This transferring step can be advantageously carried out without removing the bead moulding devices 14 from tyre 2, so that the tyre is transferred to the moulding unit 40 while the beads 6 are still tightened between the clamping surfaces 15, 16.

In the embodiment shown in FIG. 1, the moulding unit 40 comprises a plurality of moulds 41 disposed in a rotatable structure 42 so that they are sequentially brought to a loading/unloading position 43 where removal of the vulcanised tyre 2 and subsequent introduction of the green tyre 2 coming from the moulding and pre-vulcanisation station 13 is carried out.

Each mould 41 essentially has a pair of axially opposite plates 44 designed to operate on the sidewalls 9 of tyre 2, and a plurality of moulding sectors 45 designed to operate against the tread band 8 and together with the plates 44 defining a moulding cavity 46 having an inner wall the shape of which substantially matches the outer surface 2b of the tyre 2 when moulding is over.

Also defined in the moulding cavity 46 is at least one seat 47 for housing the bead moulding devices 14, more specifically the expandable toroidal support 18, counter-flanges 27, and axially external 30 and internal 17 annular locating elements.

During introduction of tyre 2 into the mould 41, the grip spigot 23 carried by the expandable toroidal support 18 lends itself to be introduced into at least one centring seat 41a provided in the mould 41 itself, so as to ensure centred positioning of tyre 2 within the mould 41. In addition, the inflated bladder 20 inside the tyre 2 stabilises the geometric conformation of the tyre itself, facilitating correct positioning of the latter in the moulding cavity 46.

Closure of mould 41 takes place by axial approaching of the axially opposite plates 44 and simultaneous radial approaching of the moulding sectors 45.

When closure has been completed, the sidewalls 9 of tyre 2 are tightened between the plates 44 and the bladder 20 of the expandable toroidal support 18, the beads 6 being clamped between the annular locating elements 30 housed in the plates 44, and the bladder 20, while the radially innermost portion of the bead is tightened between the axially internal 17 and axially external 30 annular locating elements.

Preferably, the moulding cavity 46 has slightly greater diametrical sizes than the diametrical sizes of the green tyre 2. Consequently, when the mould 41 has been fully closed, the inner wall of the moulding cavity 46 is slightly spaced apart from the radially external portion of tyre 2.

When the mould 41 is closed, completion of the vulcanisation step on tyre 2 is started. For the purpose, a vulcanisation fluid under pressure, such as steam, nitrogen, a mixture thereof or any other suitable fluid for example, preferably steam and nitrogen, is fed into the expandable bladder 20 through a feeding duct 48 opening into the mould 41 and connectable with said inlet 38 provided in the expandable toroidal support 18.

The feeding pressure of the vulcanisation fluid forces the tyre 2 to a radial expansion, through the bladder 20, until the radially external part thereof is brought to adhere against the inner wall of the moulding cavity 46. The radial expansion of tyre 2 causes stretching of same, particularly as regards the belt structure 7 and the cords forming the carcass ply or plies 3. Advantageously, the tightening action exerted on the beads 6 by the clamping surfaces 15, 16 efficiently retains the cords of the carcass ply or plies 3 close to the annular anchoring structures 5. It is therefore eliminated the risk that the stretching action induced on the cords of the carcass ply or plies 3 by effect of the radial expansion of tyre 2 should involve sliding of the cords relative to the annular anchoring structures 5 and/or other undesirable deformations of the annular anchoring structures themselves or of the beads 6.

Due to the vulcanisation fluid under pressure fed into the moulding cavity 46, as well as into other suitable channels 44a, 45a provided close to the plates 44 and/or the sectors 45 of mould 41, heat as required for cross-linking of the tyre 2 is transmitted to the latter.

Preferably, a thermal-cutting gap 49, possibly filled with low heat-conductivity material, can be provided between each of the axially external annular locating elements 30 and the respective plate 44, to limit heat transmission to the beads 6 already partly or fully cross-linked in the prior pre-vulcanisation step.

When cross-linking of tyre 2 has been completed, or has reached a sufficient degree to ensure the desired geometric and structural stability of same, the mould 41 can be opened to enable tyre 2 to be removed and transferred, upon the action of another robotized arm 50a or other suitable devices, to a dismantling station 50, where devices not shown carry out dismantling and removal of the bead moulding devices 14 from the vulcanised tyre 2.

If required, transfer of tyre 2 to the dismantling station 50 can be preceded by a pause step during which the tyre 2 itself stays in a post-vulcanisation station 51 to a controlled temperature, also provided with devices for maintaining the tyre under pressure (by compressed air, for example), where the geometric and structural stabilisation of tyre 2 is terminated.

The bead moulding devices 14 can advantageously be maintained in engagement relationship on the beads 6 of tyre 2 during the post-vulcanisation step, so as to further ensure an optimal geometric and size stability of the beads 6 themselves. In particular, maintaining the beads 6 under tightened conditions during the post-vulcanisation step enables the engagement of the end flaps 3a of the carcass ply; or plies to be stabilised with respect to the annular reinforcing structures 5, until complete structural stabilisation of the elastomeric material so that undesirable slipping off or structural deformations are avoided. It is therefore possible, in case of need, to reduce the residence time of tyre 2 within the mould 41, to the benefit of productivity, without any risk of impairing the structural stability and integrity of the tyre 2 itself.

The invention claimed is:

1. A process for producing a pneumatic tyre, comprising:
   (i) building a green tyre, said green tyre having a pair of beads each defined along a respective inner circumferential edge of said tyre;
   (ii) tightening each bead between two axially opposite clamping surfaces;
   (iii) transferring the tyre into a moulding cavity of a vulcanisation press having an inner wall substantially conforming to the shape of an outer surface of the moulded tyre; and
   (iv) moulding and vulcanising the tyre,
   wherein at least during steps iii) and iv), tightening of the beads between said clamping surfaces is maintained, and
   wherein said axially opposite clamping surfaces are spring urged against each other with a predetermined tightening load during steps ii), iii), and iv).

2. The process as claimed in claim 1, wherein step i) comprises manufacture of at least one carcass ply having end flaps turned up around respective annular reinforcing structures integrated into each of the beads of the tyre.

3. The process as claimed in claim 1, further comprising the step of: v) at least partially pre-vulcanising the beads tightened between the clamping surfaces.

4. The process as claimed in claim 3, wherein step v) takes place after step ii) and before step iii).

5. The process as claimed in claim 3, wherein step v) takes place after step iii) and before step iv).

6. The process as claimed in claim 1, wherein step iii) is carried out by means of a robotized arm.

7. The process as claimed in claim 1, wherein step ii) takes place by means of bead moulding devices supported on a grip spigot in coaxial relationship with the tyre.

8. The process as claimed in claim 3, wherein step v) is carried out by localised heating of the tyre at the beads.

9. The process as claimed in claim 1, wherein each of said axially opposite clamping surfaces comprises a clamping surface axially internal to the respective bead and defined by an axially internal annular locating element comprising circumferentially contiguous sectors.

10. The process as claimed in claim 9, wherein step ii) comprises the steps of:
   iia) introducing the axially internal annular locating elements into the tyre;
   iib) radially translating said sectors from a radially contracted condition at which each axially internal annular locating element has a smaller maximum diametrical size than the inner diameter of the beads, and a radially expanded condition at which each axially internal annular locating element has a greater outer diameter than the inner diameter of the beads.

11. The process as claimed in claim 9, wherein each of said axially opposite annular clamping surfaces comprises a clamping surface axially external to the respective bead and defined by an axially external annular locating element that can be coaxially moved towards the respective axially internal annular locating element at a laterally opposite position.

12. The process as claimed in claim 3, wherein said axially opposite clamping surfaces are spring urged against each other with a predetermined tightening load during the step v).

13. The process as claimed in claim 3, wherein the axially opposite clamping surfaces are locked to a predetermined mutual distance during step v).

14. The process as claimed in claim 1, wherein step i) of building a green tyre is carried out by means of at least one forming drum.

15. The process as claimed in claim 14, comprising a step of: vi) retaining the green tyre by a transfer device acting on at least one portion of the outer surface of the green tyre, said step vi) being subsequent to step i) and preceding step ii).

16. The process as claimed in claim 15, comprising a step of: vii) disengaging said forming drum from a built green tyre, step vii) being subsequent to step vi) and preceding step ii).

17. The process as claimed in claim 1, wherein an expandable bladder is introduced into the tyre before step ii) of tightening each bead.

18. The process as claimed in claim 17, wherein said expandable bladder is inflated within the tyre before carrying out step iii).

19. The process as claimed in claim 17, wherein a vulcanisation fluid is admitted into said expandable bladder during at least part of vulcanisation of the tyre.

20. The process as claimed in claim 1, wherein during step iv), at least part of vulcanisation of the tyre is carried out simultaneously with the step of moulding the tyre.

21. The process as claimed in claim 1, wherein the beads are heat insulated relative to the moulding cavity during at least part of the moulding and vulcanising step iv) of the tyre.

22. The process as claimed in claim 1, wherein a stretching step viii) of the tyre is carried out concurrently with the moulding and vulcanising step of the tyre.

23. The process as claimed in claim 22, wherein step viii) comprises tensioning of cords as part of a carcass ply.

24. The process as claimed in claim 1, comprising step ix) carrying out a tyre pause at a controlled temperature in a post-vulcanisation station after step iv).

25. The process as claimed in claim 24, comprising maintaining tightening of the beads between said clamping surfaces during step ix).

26. A process for producing a pneumatic tyre, comprising:
building a green tyre on a forming drum, said green tyre having a pair of beads each defined along a respective inner circumferential edge of said tyre;
retaining the green tyre by a transfer device acting on at least one portion of the outer surface of the green tyre; and
disengaging said forming drum from the built green tyre retained by the transfer device; then:
tightening each bead between two axially opposite clamping surfaces;
at least partially pre-vulcanising the beads tightened between the clamping surfaces;
transferring the tyre into a moulding cavity of a vulcanisation press having an inner wall substantially conforming to the shape of an outer surface of the moulded tyre; and
moulding and vulcanising the tyre,
wherein at least during the transferring and the moulding, tightening of the beads between said clamping surfaces is maintained, and
wherein said axially opposite clamping surfaces are spring urged against each other with a predetermined tightening load during the partially pre-vulcanising the beads.

27. The process as claimed in claim 26, wherein the building the green tyre comprises manufacture of at least one carcass ply having end flaps turned up around respective annular reinforcing structures integrated into each of the beads of the tyre.

28. The process as claimed in claim 26, wherein the partially pre-vulcanising the beads takes place after the tightening each bead between the two axially opposite clamping surfaces and before the transferring the tyre into the moulding cavity.

29. The process as claimed in claim 26, wherein the partially pre-vulcanising the beads takes place after the transferring the tyre into the moulding cavity and before the moulding and vulcanising the tyre.

30. The process as claimed in claim 26, wherein the transferring the tyre into the moulding cavity is carried out by means of a robotized arm.

31. The process as claimed in claim 26, wherein the tightening each bead between the two axially opposite clamping surfaces takes place by means of bead moulding devices supported on a grip spigot in coaxial relationship with the tyre.

32. The process as claimed in claim 26, wherein the partially pre-vulcanising the beads is carried out by localised heating of the tyre at the beads.

33. The process as claimed in claim 26, wherein each of said axially opposite clamping surfaces comprises a clamping surface axially internal to the respective bead and defined by an axially internal annular locating element comprising circumferentially contiguous sectors.

34. The process as claimed in claim 33, wherein the tightening each bead between the two axially opposite clamping surfaces comprises:
introducing the axially internal annular locating elements into the tyre; and
radially translating said sectors from a radially contracted condition at which each axially internal annular locating element has a smaller maximum diametrical size than the inner diameter of the beads, and a radially expanded condition at which each axially internal annular locating element has a greater outer diameter than the inner diameter of the beads.

35. The process as claimed in claim 33, wherein each of said axially opposite annular clamping surfaces comprises a clamping surface axially external to the respective bead and defined by an axially external annular locating element that can be coaxially moved towards the respective axially internal annular locating element at a laterally opposite position.

36. The process as claimed in claim 26, wherein said axially opposite clamping surfaces are spring urged against each other with a predetermined tightening load during the tightening each bead between the two axially opposite clamping surface, the transferring the tyre into the moulding cavity, and the moulding and vulcanising the tyre.

37. The process as claimed in claim 26, wherein the axially opposite clamping surfaces are locked to a predetermined mutual distance during the tightening each bead between the two axially opposite clamping surfaces, the transferring the tyre into the moulding cavity, and the moulding and vulcanising the tyre.

38. The process as claimed in claim 26, wherein an expandable bladder is introduced into the tyre before the tightening each bead between the two axially opposite clamping surface.

39. The process as claimed in claim 38, wherein said expandable bladder is inflated within the tyre before carrying out the transferring the tyre into the moulding cavity.

40. The process as claimed in claim 38, wherein a vulcanisation fluid is admitted into said expandable bladder during at least part of vulcanisation of the tyre.

41. The process as claimed in claim 26, wherein during the moulding and vulcanising the tyre, at least part of vulcanisation of the tyre is carried out simultaneously with the step of moulding the tyre.

42. The process as claimed in claim 26, wherein the beads are heat insulated relative to the moulding cavity during at least part of the moulding and vulcanising the tyre.

43. The process as claimed in claim 26, wherein a stretching of the tyre is carried out concurrently with the moulding and vulcanising step of the tyre.

44. The process as claimed in claim 43, wherein the stretching of the tyre comprises tensioning of cords as part of a carcass ply.

45. The process as claimed in claim 26, comprising carrying out a tyre pause at a controlled temperature in a post-vulcanisation station after the moulding and vulcanising the tyre.

46. The process as claimed in claim 45, comprising maintaining tightening of the beads between said clamping surfaces during the carrying out the tyre pause.

* * * * *